United States Patent
Kaushik

(10) Patent No.: US 10,129,315 B2
(45) Date of Patent: Nov. 13, 2018

(54) OPTIMIZING MULTIMEDIA STREAMING IN WLANS (WIRELESS LOCAL ACCESS NETWORKS) WITH A REMOTE SDN (SOFTWARE-DEFINED NETWORKING) CONTROLLER

(71) Applicant: Fortinet, Inc., Sunnyvale, CA (US)

(72) Inventor: Anil Kaushik, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 15/435,165

(22) Filed: Feb. 16, 2017

(65) Prior Publication Data

US 2017/0187780 A1  Jun. 29, 2017

Related U.S. Application Data

(63) Continuation of application No. 15/071,748, filed on Mar. 16, 2016, now Pat. No. 9,609,084, which is a (Continued)

(51) Int. Cl.
*H04N 21/238* (2011.01)
*H04L 29/06* (2006.01)
(Continued)

(52) U.S. Cl.
CPC ...... *H04L 65/607* (2013.01); *H04L 29/08954* (2013.01); *H04L 29/08972* (2013.01);
(Continued)

(58) Field of Classification Search
CPC ..... H04N 21/2385; H04L 45/38; H04L 41/50; H04L 41/5022; H04L 29/08954; H04L 29/08972
See application file for complete search history.

(56) References Cited

U.S. PATENT DOCUMENTS 5,898,696 A * 4/1999 Proctor ................ H04B 7/2659
370/342
5,910,179 A   6/1999 Mohseni
(Continued)

FOREIGN PATENT DOCUMENTS

CN   103369613 A * 10/2013
CN   103369613 A * 10/2013
WO   WO 1997/037454   10/1997

*Primary Examiner* — Robert J Hance
(74) *Attorney, Agent, or Firm* — Law Office of Dorian Cartwright; Dorian Cartwright

(57) ABSTRACT

An SDN controller to provision network resources at a data plane to keep progressive downloads of multimedia files proportional to encoding rates is disclosed. Packets from a new or unknown flow being downloaded at a default rate are forwarded from an access point, or other device, to an SDN controller for analysis. If a progressive download of a multimedia file (e.g., a video file) in progress is detected, an encoding rate of frames for the multimedia file is determined. A target download rate for the multimedia file at the access point is determined based on the encoding rate, in an embodiment. Other optional factors also take into account network-wide data plane information gathered by the SDN controller from various points on the network. Additionally, a playback history for a particular multimedia file can affect the target download rate, based on whether, for example, a file is likely to be quickly halted.

20 Claims, 6 Drawing Sheets

Related U.S. Application Data continuation of application No. 14/514,420, filed on Oct. 15, 2014, now Pat. No. 9,369,744.

(51) Int. Cl.

| | | |
|---|---|---|
| *H04N 21/2385* | (2011.01) | |
| *H04N 21/24* | (2011.01) | |
| *H04L 12/721* | (2013.01) | |
| *H04L 12/24* | (2006.01) | |
| *H04L 29/08* | (2006.01) | |
| *H04N 21/239* | (2011.01) | |
| *H04L 12/815* | (2013.01) | |
| *H04L 12/717* | (2013.01) | |
| *H04L 12/823* | (2013.01) | |
| *H04W 84/12* | (2009.01) | |
| *H04L 12/26* | (2006.01) | |

(52) U.S. Cl.
CPC .......... *H04L 41/0893* (2013.01); *H04L 41/50* (2013.01); *H04L 41/5022* (2013.01); *H04L 45/38* (2013.01); *H04L 47/22* (2013.01); *H04L 65/60* (2013.01); *H04L 65/80* (2013.01); *H04L 67/02* (2013.01); *H04L 67/06* (2013.01); *H04L 67/322* (2013.01); *H04L 67/327* (2013.01); *H04N 21/2385* (2013.01); *H04N 21/2393* (2013.01); *H04N 21/2402* (2013.01); *H04N 21/2407* (2013.01); *H04L 41/0896* (2013.01); *H04L 43/04* (2013.01); *H04L 45/42* (2013.01); *H04L 47/32* (2013.01); *H04L 69/324* (2013.01); *H04W 84/12* (2013.01)

(56) References Cited

U.S. PATENT DOCUMENTS

| | | |
|---|---|---|
| 5,925,127 A | 7/1999 | Ahmad |
| 5,926,137 A | 7/1999 | Nealy |
| 5,933,827 A | 8/1999 | Cole et al. |
| 5,946,346 A | 8/1999 | Ahmed et al. |
| 5,946,487 A | 8/1999 | Dangelo |
| 7,581,019 B1* | 8/2009 | Amir ................ H04L 47/10 370/235 |
| 7,760,699 B1 | 7/2010 | Malik |
| 8,363,102 B1 | 1/2013 | Kadoch et al. |
| 2003/0109261 A1 | 6/2003 | Razavilar |
| 2007/0054645 A1 | 3/2007 | Pan |
| 2008/0062988 A1* | 3/2008 | Daigle ................ H04L 12/14 370/392 |
| 2010/0103831 A1 | 4/2010 | Caldwell |
| 2013/0083691 A1* | 4/2013 | Murphy ............. H04W 12/06 370/254 |
| 2013/0163430 A1* | 6/2013 | Gell ............. H04N 21/23439 370/235 |
| 2014/0204746 A1 | 7/2014 | Sun |
| 2014/0233413 A1* | 8/2014 | Dahod ............ H04N 21/6131 370/252 |
| 2014/0330973 A1* | 11/2014 | Freimuth ............. H04L 67/32 709/226 |
| 2015/0009830 A1* | 1/2015 | Bisht ............... H04L 47/125 370/236 |
| 2015/0127805 A1* | 5/2015 | Htay ............. H04L 43/0876 709/224 |
| 2015/0271710 A1* | 9/2015 | Zhang ............... H04L 47/20 370/331 |
| 2016/0241452 A1* | 8/2016 | Ringland ........... H04L 41/082 |

* cited by examiner

OPTIMIZING MULTIMEDIA STREAMING IN WLANS (WIRELESS LOCAL ACCESS NETWORKS) WITH A REMOTE SDN (SOFTWARE-DEFINED NETWORKING) CONTROLLER

RELATED APPLICATION DATA

This application claims the benefit as a continuation of U.S. application Ser. No. 15/071,748, entitled Optimizing Multimedia Streaming in WLANs (Wireless Local Access Networks) and filed on Mar. 16, 2016, which is a continuation of U.S. application Ser. No. 14/514,420, entitled Optimizing Multimedia Streaming in WLANs (Wireless Local Access Networks) and filed on Oct. 15, 2014, the contents of which is hereby incorporated in its entirety.

FIELD OF THE INVENTION

The invention relates generally to wireless computer networking, and more specifically, to using SDN (Software-Defined Networking) to optimize video streaming in WLAN networks at a data plane.

BACKGROUND

Video streaming is one of the most burdening applications on networks. The high data rate necessary for video, and in particular, high definition video can dominate resources used for many other types of data transfers transacted on the network. In a WLAN, access points can service data transfers for many wireless stations connecting to a wired backbone.

Video files can be prohibitively burdensome if the entire file is downloaded altogether. HTTP (Hyper Text Transfer Protocol) adaptive streaming provides a technique for progressive downloading of chunks, or portions, of the video file that can be played back at a client without having the entire file present. In more detail, a video can be divided into 10 chunks, each having about 10% of the total video file. Once a first chunk has been downloaded to the client, it fills the buffer with 8 seconds of playback time, for instance. During those 8 seconds, the next chunk can be downloaded and so on.

However, a download rate for progressive downloading can be aggressive and without consideration for an actual download rate necessary for an encoding rate by a streaming server. For example, a large playback device such as web-enabled television may have a fast download rate assigned due to its potential playback resolution. The selected video file, on the other hand, may have a relatively low resolution that is encoded for streaming at a bit rate much lower than assumed.

One technique to address this issue is to download customized software to a station. But reconfiguration of stations running on a station is not always desirable. For instance, guests connecting to a public hot spot for only one time would be burdened with the process of downloading and installing a client. Furthermore, many computer users are weary about malicious applications downloaded from the Internet.

What is needed is a robust technique to data plane provisioning of network resources more efficiently by keeping a download rate proportional to an encoding rate.

SUMMARY

These shortcomings are addressed by the present disclosure of methods, computer program products, and systems for provisioning of network resources at a data plane to keep progressive downloads of multimedia files proportional to encoding rates.

In one embodiment, packets from a new or unknown flow being downloaded at a default rate are forwarded from an access point, or other device, to an SDN (Software-Defined Networking) controller for analysis. If a progressive download of a multimedia file (e.g., a video file) in progress is detected, an encoding rate of frames for the multimedia file is determined.

A target download rate for the multimedia file at the access point is determined based on the encoding rate, in an embodiment. Other optional factors also take into account network-wide data plane information gathered by the SDN controller from various points on the network. Additionally, a playback history for a particular multimedia file can affect the target download rate, based on whether, for example, a file is likely to be quickly halted.

One or more OpenFlow rules (or other protocol for rules) is generated to implement the target download rate at a data plane of the access point. The one or more OpenFlow rules are implemented at the data plane of the access point, and possibly other devices along a data path, to meet the target data rate.

Advantageously, network resources are more efficiently provisioned by keeping a progressive download rate proportional to an encoding rate.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The present invention provides methods, computer program products, and systems for optimizing multimedia downloads with an SDN (Software-Defined Networking) controller. For example, video files downloading faster than necessary for a certain encoding bit rate can be slowed down using data plane operations on an access point, or other network device. Likewise, downloading can be increased as needed for an encoding bit rate. One of ordinary skill in the art will recognize that many other scenarios are possible, as discussed in more detail below.

Systems to Optimize Multimedia Downloads with an SDN Controller (FIGS. 1-4)

Figure 1:
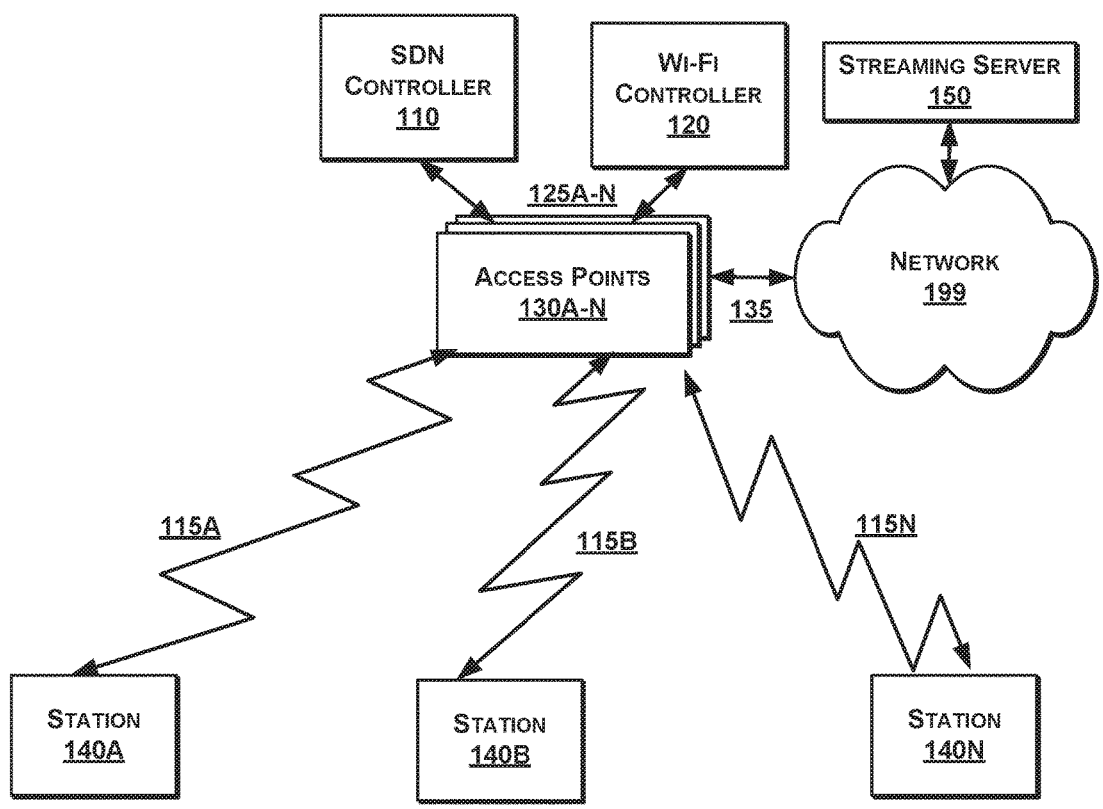
FIG. 1 is a high-level block diagram illustrating a system to optimize multimedia downloads with an SDN controller, according to one embodiment.

FIG. 1 is a high-level block diagram illustrating a system 100 to optimize multimedia downloads with an SDN controller, according to one embodiment. The system 100 comprises SDN controller 110, Wi-Fi controller 120, access points 130A-130N, stations 140A-N and streaming server 150. The components can be coupled to a network 199, such as the Internet, a local network or a cellular network, through any suitable wired (e.g., Ethernet) or wireless (e.g., Wi-Fi or 4G) medium, or combination. In a preferred embodiment, the stations 140A-140N are coupled to the access points 130A-130N through wireless communication channels 115A-115N, while the access points 130A-130N can be coupled to the SDN and Wi-Fi controllers 110, 120 through wired communication channels 125A-125N and to network 199 through wired communication channel 135. Other embodiments of communication channels are possible, including a cloud-based controller, and hybrid networks. Additional network components can also be part of the system 100, such as firewalls, virus scanners, routers, switches, application servers, databases, and the like. In general, the SDN controller 110 implements layer 2 rules at the access points 130A-130N to optimize network conditions, such as throughput, latency, and the like.

Figure 7:
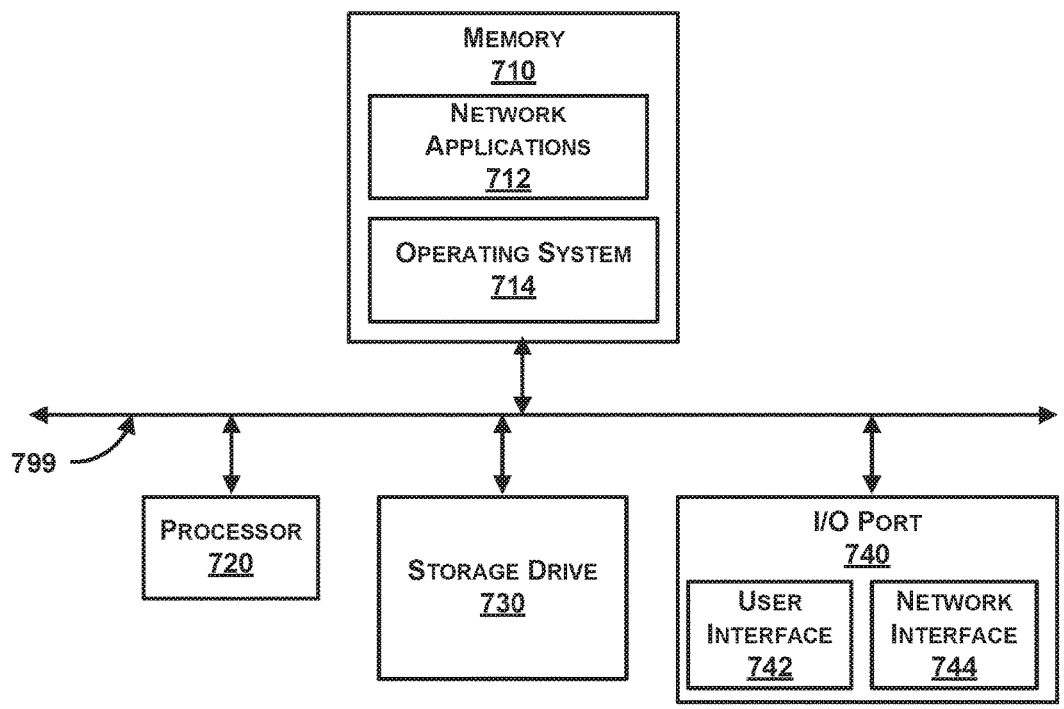
FIG. 7 is a block diagram illustrating an exemplary computing device, according to one embodiment.

The SDN controller 110 can be, for example, a personal computer, a laptop computer, a server, a cloud-based device, a virtual device, or the like implemented in any of the computing devices discussed herein (e.g., see FIG. 7). In operation, the SDN controller 110 can communicate with each of the access points 130A-130N using the OpenFlow or other protocol to directly implement layer 2 rules to affect network behavior. More specifically, the SDN controller 110 adjusts, in one embodiment, a download rate for a particular multimedia file based on an encoding rate. OpenFlow provides cross-vendor communication as an abstraction of vendor-specific internal programming. Initially, new or unknown flows forwarded from one of the access points 130A-130N are sniffed to detect a progressive download. Deep packet inspection can reveal a file name and an encoding rate of the multimedia file. One or more rules are generated with respect to the multimedia file for transmission and implementation at one or more of the access points 130A-130N. Other factors that can affect a target download rate include network conditions and characteristics of the file. For example, a multimedia file that users tend to halted after a short time can be downloaded more slowly by reducing the priority. Also, a download rate can be slowed down for advertisements. Many implementation-specific scenarios are possible.

More generally, the SDN controller 110 centralizes data plane decision-making for the access points 130A-130N. To do so, the access points 130A-130N are configured to concede layer 2 routing decisions to the SDN controller 110 by forwarding packets to the SDN controller 110 for routing instructions. The SDN controller can use input gathered across the network to make layer 2 routing decisions for the packets which are communicated back to the forwarding one of the access points 130A-130N. In one embodiment, routing decisions are made as a reaction to new or unknown flows. In another embodiment, access points are pre-configured by the SDN controller with rules for automatically implementing SDN controller 110 decisions on matching packets in the future. In still another embodiment, the rules or policies are distributed to the other network devices along a routing path for multi-hop data plane control of download rates for a particular multimedia file. Updated rules can be sent at a later time. Additional embodiments of the SDN controller 110 are discussed with respect to FIG. 2.

The Wi-Fi controller 120 can be implemented in any of the computing devices discussed herein (e.g., see FIG. 7). For example, the Wi-Fi controller 120 can be an MC1500 or MC6000 device by Meru Networks of Sunnyvale, Calif. Within the system 100, the Wi-Fi controller 120 communicates with each of the access point 130A-130N to manage wireless connections to the stations 140A-140N using IEEE protocols. In some embodiments, BSSIDs (Basic Service Set Identifiers) are managed from the Wi-Fi controller 120 to implement functionality such as seamless mobility for transparent handoffs of stations between access points all having a common BSSID. In other functionality such as virtual port, the Wi-Fi controller 130 coordinates a uniquely-assigned BSSID for each station in order to provide individualized management of stations connected at any access point. In some embodiments, the Wi-Fi controller 120 can be an independent physical device form. Additional embodiments of the Wi-Fi controller 120 are discussed with respect to FIG. 4.

The access points 130A-130N include one or more individual access points implemented in any of the computing devices discussed herein (e.g., see FIG. 7). For example, the access points 130A-130N can be an AP 110 or AP 433 (modified as discussed herein) by Meru Networks of Sunnyvale, Calif. A network administrator can strategically place the access points 130A-130N for optimal coverage area over a locale. The access points 130A-130N can, in turn, be connected to a wired hub, switch or router connected to the network 199. In embodiment, the access points 130A-130N functionality is incorporated into a switch or router. To provide network service to the stations 140A-140N, in one embodiment, the access points 130A-130N comply with IEEE 802.11 protocols (promulgated by the Institute of Electrical and Electronics Engineers) to provide Wi-Fi service to the stations 140A-N over wireless communication channels 140A-140N. Under IEEE 802.11, a beacon with one or more BSSIDs is periodically sent to advertise a presence for new connections and maintain current connections. Then the access points 130A-130N listen for packets addressed to associated BSSIDs and ignore packets addressed to unassociated BSSIDs. Furthermore, the access points 130A-130N forward packets addressed to MAC (Media Access Control) addresses of associated stations.

The access points 130A-130N, without input from the SDN controller 110, may forward packets according to a shortest route, or other standard routing or switching algorithm. Local-level conditions can be revealed by TCP (transmission control protocol). However, the SDN controller 110 has a network-wide view of layer 2 conditions and can override inherent TCP forwarding behavior as needed. In other words, the access points 130A-130N may continue to make control plane decisions but data plane decisions are conceded to the SDN controller 110, in some or all situations. Further, although the Wi-Fi controller 120 has some network-wide visibility, it is limited to Wi-Fi-relevant information for load balancing, managing a number of station connections at a particular access point, tracking BSSIDs, and the like. While the higher-layer decisions on the access points 130A-130N can have some indirect impact on data plane decision making, the SDN controller 110 makes direct data plane decisions. The rules may require that file requests or responses be delayed to impeded downloading processes, and thereby, a download rate. The SDN controller 110 policies, as implemented, can override, co-exist, or compete with policies of the Wi-Fi controller 120 and the access points 130A-130N.

The stations 140A-140N can be, for example, a personal computer, a laptop computer, a tablet computer, a smart phone, a mobile computing device, a server, a cloud-based device, a virtual device, an Internet appliance, or any of the computing devices described herein (see e.g., FIG. 7). No special client is needed for this particular technique, although other aspects of the network may require downloads to the stations 140A-140N. Some video streaming services use a specific client (e.g., a mobile application) and others use native applications in an operating system or OEM applications such as a web browser. The stations 140A-140N connect to the access points 130A-130N for access to, for example, a LAN or external networks using an RF (radio frequency) antenna and network software complying with IEEE 802.11. In one embodiment, a user on a laptop watches videos from YouTube in real-time on a hot spot. In another embodiment, a user watches a training video on a PC connected over VPN to a cloud-based corporate server. In still another embodiment, a family watches on-demand movies on a web-enabled television.

The streaming server 150 can be one or more server devices providing videos for real-time viewing or file download. YouTube videos are sent from sent streaming servers and are viewed through a player embedded in a web page of a web browser. Encoding rates can be affected by factors such as playback resolution (e.g., high-definition or standard definition), playback speed (e.g., slow motion or fast forward), network performance (e.g., ping round trip time), and playback device (e.g., smart phone or television). Once encoded, the streaming server transmits multimedia files, in one embodiment, by segmenting an individual multimedia file into multiple chunks for progressively downloading chunk-by-chunk. Numbered chunks can be transmitted serially or in parallel depending on a download rate negotiated between the streaming server 150 and a client, and then reassembled at the client. The download rate can be negotiated between the streaming server 150 one of the stations 140A-140N, and the without consultation of a relevant access point 130A-130N. For example, an application or web browser running on a station can request high-definition quality video streaming. In another example, based on a certain number of dropped packets or other network issues, the download rate may be renegotiated to standard quality video streaming in order to improve playback. However, these application layer negotiations can be independent of layer 2 routing decisions made at the access points 130A-130N responsive to rules promulgated by the SDN controller 110. As a result of layer 2 changes, a first chunk can be downloaded at a first rate as negotiated at an application-layer by a station and streaming server, while subsequent chunks are downloaded at a second rate as affected by data plane layer rules. Additional adjustments can be implemented with a third rate, fourth rate or other, based on updates on the system 100 (e.g., link conditions or file history).

Figure 2:
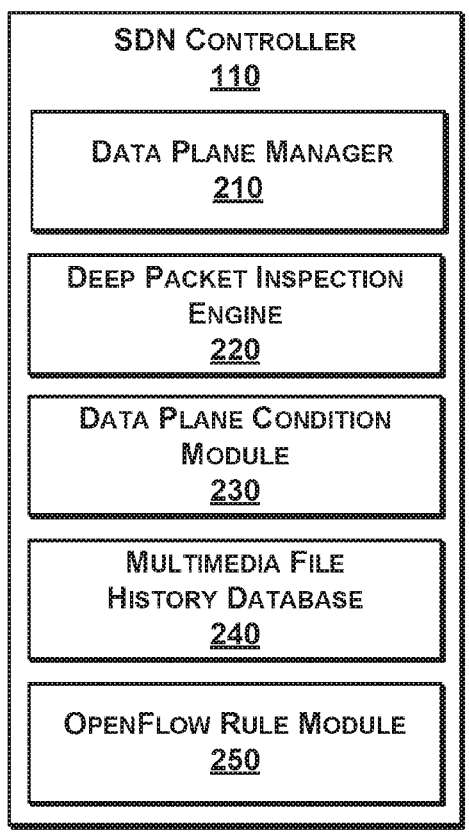
FIG. 2 is a more detailed block diagram illustrating the SDN controller of the system of FIG. 1, according to one embodiment.

FIG. 2 is a more detailed block diagram illustrating the SDN controller 110 of the system 100, according to one embodiment. The SDN controller 110 comprises a data plane manager 210, a deep packet inspection engine 220, a data plane condition module 230, a multimedia file history database 240, and an OpenFlow rule module 250. The components can be implemented in hardware, software, or a combination of both.

The data plane manager 210 uses a communication interface to connect with access points and other network devices around the network 100. Access points can be registered with the SDN controller 110 manually by a network administrator or automatically by receiving notification from the Wi-Fi controller 120. Forwarded packets and status information is received by the data plane manager 210 and rules are sent to for implementation. The data plane manager 210 can call various modules for analysis and a determination of resulting actions. Some embodiments are only concerned with matching a download rate to an encoding rate by use of the deep packet inspection engine 220. But other embodiments use the multimedia file history database 240 to make file specific determinations, and further embodiments use the data plane condition module 230 to factor in real-time routing conditions. The data plane manager 210 can call the OpenFlow rule module 250 to generate rules to affect progressive downloads based on the analyses. Additional modules can be added for other types of analysis and action.

The deep packet inspection engine 220 can sniff forwarded packets to identify multimedia files being progressively downloaded among other types of data transfers. In one example, information contained in headers is easily recognizable. In another example, information contained in the data can be pattern matched or hashed against a database for identification of applications, files, encoding rates, and the like. One example of deep packet inspection can leverage specific rules for YouTube or other types of files by being pre-programmed with rules on where in data packets to find needed information according to site-specific formatting. In one case, the deep packet inspection engine 220 calculates an encoding rate by identifying a file size from an HTTP header and a duration from a video header, such that [encoding rate]=[file size]/[duration]. Encoding rate can also be determined from empirical observation, by interrogating the streaming server 150, and using other known techniques.

The data plane condition module 230 analyzes local conditions received from various points around the network 100, including from the access points 130A-N. Network-level conditions can be derived from the local conditions to give a broader view of how various situations affect the network as a whole. As a result, a positive view from one part of the network 100 may cause an associated one of the access points 130A-N to liberally grant bandwidth, while a negative view of the overall network may benefit more from more conservative grants of bandwidth to prevent further downstream burdens.

The multimedia file history database 240, in an embodiment, stores data records or tables about playbacks of particular files and/or file types. An average playback length or number of chunks provide a parameter about how much of the multimedia file that is actually utilized by an end user. Further statistics such as standards of deviation and histograms can provided deeper insight as to actual use. File types can be indicated by URL, data file format, meta tags, subject matter, user ratings, and any other appropriate category. Other type of relevant information can also be stored, such as download rate for other files at the same URL, the same access point, or the same station.

The OpenFlow rule module 250 generates and stores rules for implementation at the access points 130A-N and other network devices, for example, based on an encoding rate calculated by the deep packet inspection engine 220 and a download rate reported by an access point. The OpenFlow protocol is just one example of rule formats and can be substituted by other programming interfaces such as XML, source code, proprietary commands and the like. Examples of OpenFlow rules include Boolean style conditions. One rule can broadly impose certain conditions on all progressive downloads of multimedia files. One rule can set a minimum file size threshold for applying rules to adjust download rates. One rule can set a lowest priority for all multimedia packets addressed from unverified URLs of specifically-listed URLs. One rule can temporarily increase a delay of all standard definition video. Numerous other rules are possible.

Figure 3:
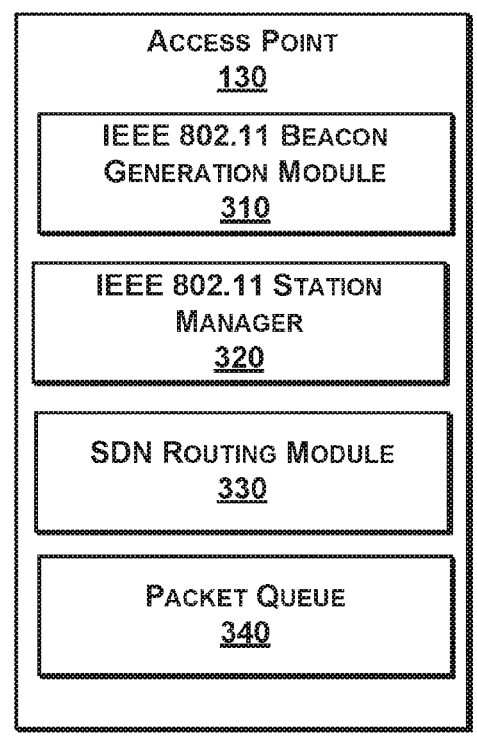
FIG. 3 is a more detailed block diagram illustrating an access point of the system of FIG. 1, according to one embodiment.

FIG. 3 is a more detailed block diagram illustrating a representative access point 130 of the system 100, according to one embodiment. The access point 130 comprises an IEEE 802.11 beacon generation module 310, an IEEE 802.11 station manager 320, an SDN routing module 330, and a packet queue 340. The components can be implemented in hardware, software, or a combination of both.

The IEEE 802.11 beacon generation module 310 generates beacons with embedded BSSIDs and parameters, according to IEEE 802.11 protocols. The IEEE 802.11 station manager 320 stores globally and/or locally-influenced parameter values, policy-based parameter values, manually configured parameter values, or the like. Wi-Fi status data related to a number of connected stations, usage data, and the like can be collected from the IEEE 802.11 beacon generation module 310 and the IEEE 802.11 station manager 320 for the SDN controller 110.

The SDN routing module 330 forwards packets and statuses to the SDN controller 110. The first few packets from new flows can be sent to the SDN controller 110 for analysis. Alternatively, there may already be rules present that direct handling of the new flows. Example statuses can be a download rate for a specific flow, queue capacity, routing statistics, and more. Periodic updates are made on a regular basis or responsive to change. Additionally, the SDN routing module 330 also receives an implements rules in OpenFlow or other formats. The packet queue 340 stores requests for multimedia file and responsive packets being progressively downloads and flows until forwarded to an appropriate station.

Figure 4:
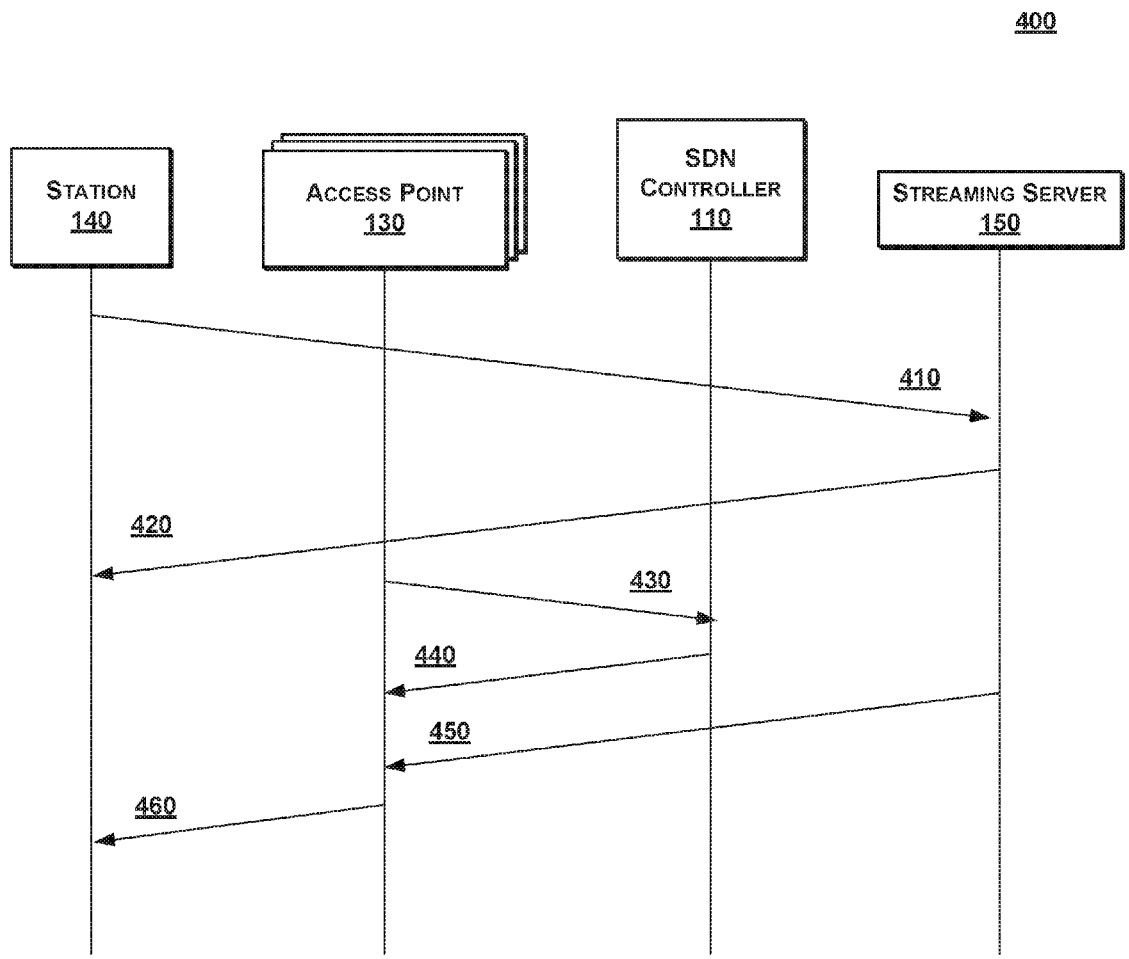
FIG. 4 is a sequence diagram illustrating interactions between components of the system of FIG. 1, according to one embodiment.
Figure 5:
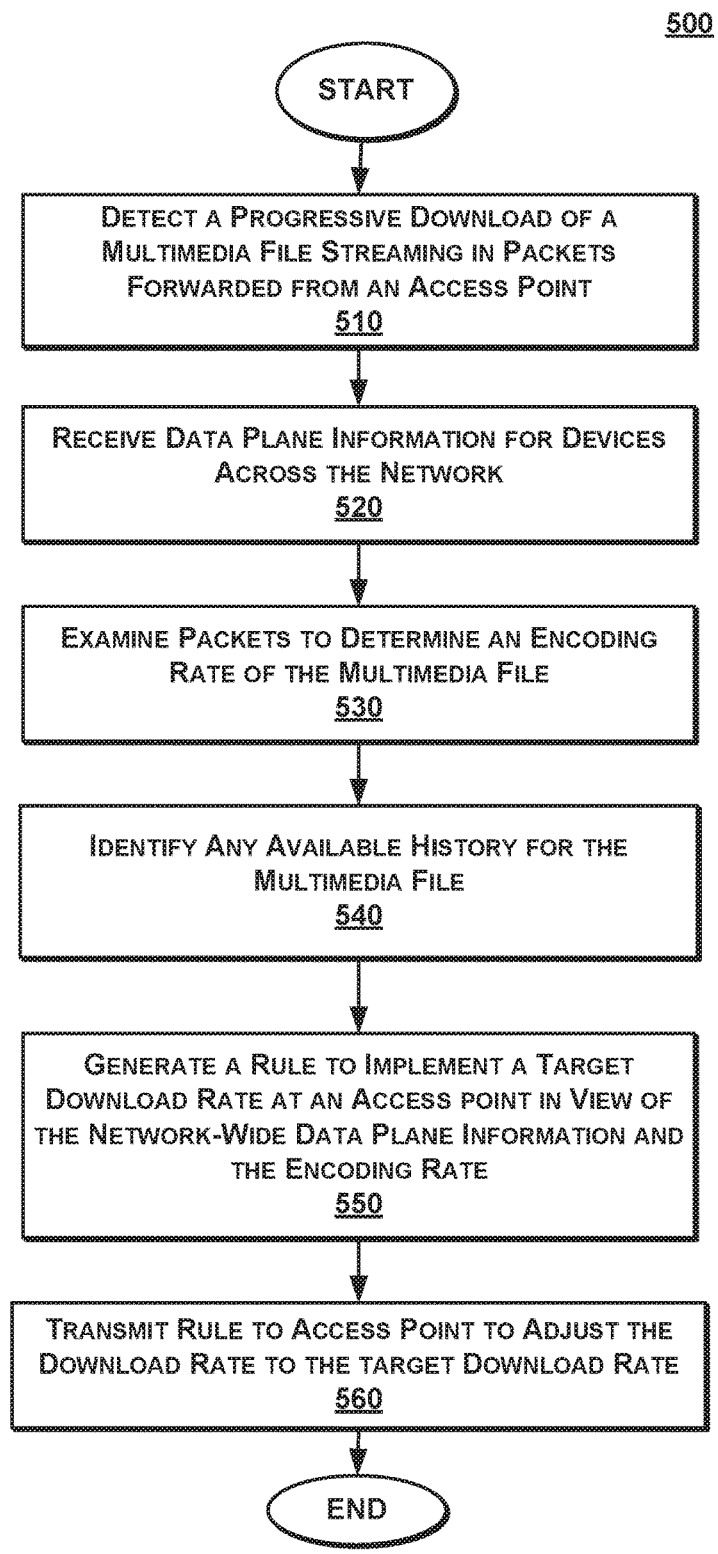
FIG. 5 is a flow diagram illustrating a method, at the SDN controller, for optimizing multimedia downloads, according to one embodiment.
Figure 6:
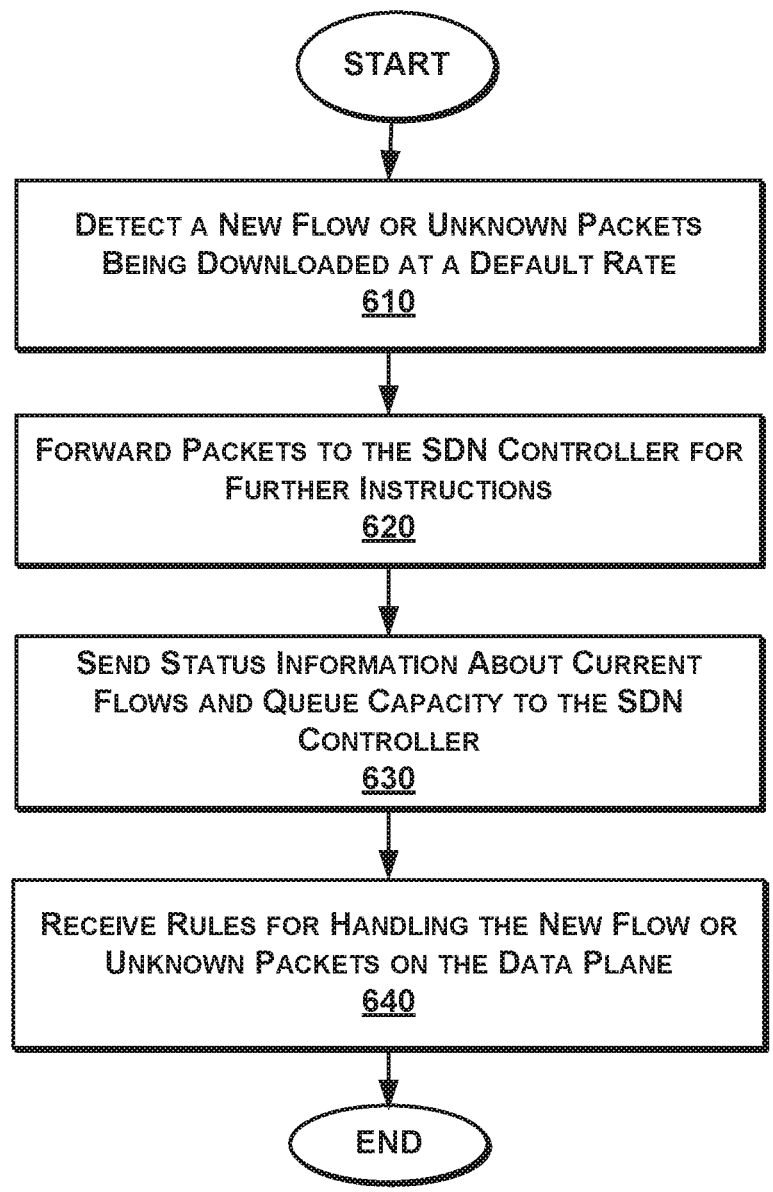
FIG. 6 is a flow diagram illustrating a method, at the access point, for optimizing multimedia downloads, according to one embodiment.

FIG. 4 is a sequence diagram illustrating interactions 400 between components of the system 100 of FIG. 1, according to one embodiment. In between the interactions, methods performed within the components of FIG. 4 are illustrated in FIGS. 5 and 6. The illustrated interactions 400 are not intended to be limiting. As such, the interactions 410 to 460 can be a portion of steps from a longer process.

Initially, at interaction 410, the station 130 sends a request for a multimedia file to the streaming server 150. At interaction 420, the streaming server 150 responds by downloading a first chunk of the multimedia file. Although interactions 410 and 420 travel through the access point 130, the subject technique has yet to be applied at those components.

At interaction 430, the access point 130 also sends at least a portion of the first chunk to the SDN controller 110. In response, at interaction 440, OpenFlow rules concerning the multimedia file are sent to the access point 130. Subsequent chunks sent at interaction 450 are sent to the access point 130 and this time affected by the subject technique at this point. Afterwards, at interaction 460, the subsequent chunks are sent to the station 130. Not shown, are requests sent from station 130 to the access point 130 and affected by the subject technique prior to being forwarded to the streaming server 150.

Methods for Optimizing Multimedia Downloads in with an SDN Controller (FIG. 5-6)

FIG. 5 is a flow diagram illustrating a method 500, an SDN controller, for optimizing multimedia downloads, (e.g., the SDN controller 110 of FIG. 1), according to one embodiment. One of ordinary skill in the art will recognize that the method 500 is non-limiting as other embodiments can have more or less steps and can be performed in a different order.

At step 510, a progressive download of a multimedia file is detected in packets forwarded from an access point of other device. At step 520, data plane information is received for devices across a network. At step 530, packets are examined to determine a rate of encoding for the multimedia file. At step 540, a target download rate for the multimedia file is determined based on the encoding rate. At step 550, one or more rules are generated to implement the target download rate at the access point in view of network-wide data plane information and the encoding rate. At step 560, the rules are transmitted to the access point to adjust the download rate to the target download rate.

FIG. 6 is a flow diagram illustrating a method 600, at an access point, for optimizing multimedia downloads, (e.g., the access point 130 of FIG. 1), according to one embodiment.

At step 610, a new flow or unknown packets being downloaded at a target rate are detected. At step 620, at least a portion of the packets are forwarded to the SDN controller for further instructions. At step 630, status information about current flows and a queue capacity are sent to the SDN controller. At step 640, rules for handling the new flow or unknown packets on the data plane are received.

Generic Computing Device (FIG. 7)

FIG. 7 is a block diagram illustrating an exemplary computing device 700 for use in the system 100 of FIG. 1, according to one embodiment. The computing device 700 is an exemplary device that is implementable for each of the components of the system 100, including the stations 130A-130N, the access points 130A-130N, and the SDN controller 110. The computing device 700 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 700, of the present embodiment, includes a memory 710, a processor 720, a storage device 730, and an I/O port 740. Each of the components is coupled for electronic communication via a bus 799. Communication can be digital and/or analog, and use any suitable protocol.

The memory 710 further comprises network applications 712 and an operating system 714. The network applications 712 can include the modules of SDN controllers or access points as illustrated in FIGS. 2 and 3. Other network applications 712 can include a web browser, a mobile application, an application that uses networking, a remote application executing locally, a network protocol application, a network management application, a network routing application, or the like.

The operating system 714 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 720 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 720 can be single core, multiple core, or include more than one processing elements. The processor 720 can be disposed on silicon or any other suitable material. The processor 720 can receive and execute instructions and data stored in the memory 710 or the storage device 730

The storage device 730 can be any non-volatile type of storage such as a magnetic disc, EEPROM, Flash, or the like. The storage device 730 stores code and data for applications.

The I/O port 740 further comprises a user interface 742 and a network interface 744. The user interface 742 can output to a display device and receive input from, for example, a keyboard. The network interface 744 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method in an access point of a communication network having a remote SDN (Software-Defined Networking) controller for optimizing multimedia downloads at data planes of a plurality of network devices including the access point, the method comprising the steps of:
   detecting, by a processor of the access point, a new flow concerning a specific multimedia file being downloaded from the access point to a station over a Wi-Fi connection;
   sending, by network hardware of the access point, one or more packets from the new flow to the SDN controller;
   receiving, by the access point network hardware from the SDN controller, one or more OpenFlow rules to implement a minimum file size threshold of the new flow responsive to a determination of a characteristic of the specific multimedia file, the one or more OpenFlow rules being implemented at the data plane of the access point;
   in response to the size of the multimedia file being greater than the minimum file size threshold of the one or more OpenFlow rules set by the SDN controller, adjusting, by the access point processor, the download rate of the new flow at the data plane of the access point responsive to the one or more OpenFlow rules;
   detecting, by the access point processor, subsequent packets from the new flow at the access point for download to the station; and
   sending, by the access point network hardware, the subsequent packets to the station responsive to the download rate of the one or more OpenFlow rules.

2. The method of claim 1, further comprising:
   sending link information from the data plane concerning one or more routing paths on the communication network that are relevant to the download of the multimedia file,
   wherein the one or more OpenFlow rules is based on the link information.

3. The method of claim 1, wherein the characteristic of the multimedia file comprises an encoding rate of the multimedia file relative to a download rate from the access point to the station.

4. The method of claim 1, wherein the characteristic of the multimedia file comprises a playback history of the multimedia file at stations prior to the detection of the new flow.

5. The method of claim 1, further comprising:
   dropping some of the subsequent packets to the station without transmission to the station responsive to the OpenFlow rules.

6. The method of claim 1, further comprising:
   receiving commands from a Wi-Fi controller concerning maximum file size threshold of the subsequent packets with respect to a control plane of the access point.

7. The method of claim 1, wherein the OpenFlow rules affect the download rate of the new flow from the access point to the station, wherein the download rate was initially negotiated at an application layer between the station and a source of the multimedia file.

8. The method of claim 1, wherein the OpenFlow rules concern layer 2 routing decisions.

9. The method of claim 1, further comprising:
implementing the one or more OpenFlow rules at the data plane of at least one of the network devices to meet a target download rate.

10. A non-transitory computer-readable medium storing source code that, when executed by a processor, performs a method in an access point of a communication network having a remote SDN (Software-Defined Networking) controller for optimizing multimedia downloads at data planes of a plurality of network devices including the access point, the method comprising the steps of:
detecting, by a processor of the access point, a new flow concerning a specific multimedia file being downloaded from the access point to a station over a Wi-Fi connection;
sending, by network hardware of the access point, one or more packets from the new flow to the SDN controller;
receiving, by the access point network hardware from the SDN controller, one or more OpenFlow rules to implement a minimum file size threshold of the new flow responsive to a determination of a characteristic of the specific multimedia file, the one or more OpenFlow rules being implemented at the data plane of the access point;
in response to the size of the multimedia file being greater than the minimum file size threshold of the one or more OpenFlow rules set by the SDN controller, adjusting, by the access point processor, the download rate of the new flow at the data plane of the access point responsive to the one or more OpenFlow rules;
detecting, by the access point processor, subsequent packets from the new flow at the access point for download to the station; and
sending, by the access point network hardware, the subsequent packets to the station responsive to the download rate of the one or more OpenFlow rules.

11. The non-transitory computer-readable medium of claim 10, wherein the method further comprises:
sending link information from the data plane concerning one or more routing paths on the communication network that are relevant to the download of the multimedia file,
wherein the one or more OpenFlow rules is based on the link information.

12. The non-transitory computer-readable medium of claim 10, wherein the characteristic of the multimedia file comprises an encoding rate of the multimedia file relative to a download rate from the access point to the station.

13. The non-transitory computer-readable medium of claim 10, wherein the characteristic of the multimedia file comprises a playback history of the multimedia file at stations prior to the detection of the new flow.

14. The non-transitory computer-readable medium of claim 10, wherein the method further comprises:
dropping some of the subsequent packets to the station without transmission to the station responsive to the OpenFlow rules.

15. The non-transitory computer-readable medium of claim 10, wherein the method further comprises:
receiving commands from a Wi-Fi controller concerning maximum file size threshold of the subsequent packets with respect to a control plane of the access point.

16. The non-transitory computer-readable medium of claim 10, wherein the OpenFlow rules affect the download rate of the new flow from the access point to the station, wherein the download rate was initially negotiated at an application layer between the station and a source of the multimedia file.

17. The non-transitory computer-readable medium of claim 10, wherein the OpenFlow rules concern layer 2 routing decisions.

18. The non-transitory computer-readable medium of claim 10, wherein the method further comprises:
implementing the one or more OpenFlow rules at the data plane of at least one of the network devices to meet a target download rate.

19. An access point of a communication network having a remote SDN (Software-Defined Networking) controller for optimizing multimedia downloads at data planes of a plurality of network devices including the access point, the access point comprising:
an access point processor;
an access point network hardware; and
a memory communicatively coupled to both the access point processor and the access point network hardware,
wherein the access point processor detects a new flow concerning a specific multimedia file being downloaded from the access point to a station over a Wi-Fi connection;
wherein the access point network hardware detects one or more packets from the new flow to the SDN controller,
wherein the access point network hardware receives one or more OpenFlow rules from the SDN controller to implement a minimum file size threshold of the new flow responsive to a determination of a characteristic of the specific multimedia file, the one or more OpenFlow rules being implemented at the data plane of the access point,
wherein, in response to the size of the multimedia file being greater than the minimum file size threshold of the one or more OpenFlow rules set by the SDN controller, the access point processor adjusts the download rate of the new flow at the data plane of the access point responsive to the one or more OpenFlow rules, wherein the access point processor detects subsequent packets from the new flow at the access point for download to the station, and
wherein the access point network hardware sends the subsequent packets to the station responsive to the download rate of the one or more OpenFlow rules.

20. The access point of claim 19, wherein the access point network hardware sends link information from the data plane concerning one or more routing paths on the communication network that are relevant to the download of the multimedia file, wherein the one or more OpenFlow rules is based on the link information.

* * * * *